(12) United States Patent
Zhang

(10) Patent No.: US 12,696,167 B2
(45) Date of Patent: Jul. 28, 2026

(54) METHOD AND DEVICE FOR CHANNEL-MEASUREMENT-TRIGGERED UPLINK SIGNALING AND DOWNLINK CONTROL MONITORING

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 0 days.

(21) Appl. No.: 18/386,260

(22) Filed: Nov. 2, 2023

(65) Prior Publication Data

US 2024/0073774 A1 Feb. 29, 2024

Related U.S. Application Data

(63) Continuation of application No. 17/860,109, filed on Jul. 8, 2022, now Pat. No. 11,844,008, which is a
(Continued)

(51) Int. Cl.
*H04W 40/04* (2009.01)
*H04B 7/0456* (2017.01)
(Continued)

(52) U.S. Cl.
CPC .......... *H04W 40/04* (2013.01); *H04B 7/0456* (2013.01); *H04B 7/088* (2013.01);
(Continued)

(58) Field of Classification Search
CPC . H04B 87/0413; H04B 87/695; H04W 24/10; H04W 72/12; H04W 24/08;
(Continued)

(56) References Cited

U.S. PATENT DOCUMENTS 10,484,067 B2 11/2019 Zhang
10,485,009 B2 * 11/2019 Zhang ................... H04W 72/12
(Continued)

FOREIGN PATENT DOCUMENTS

CN 104025469 A 9/2014
CN 104540164 A 4/2015
(Continued)

OTHER PUBLICATIONS

C. Yang, M. Arizabaleta-Diez, P. Weitkemper and T. Pany, "An Experimental Analysis of Cyclic and Reference Signals of 4G LTE for TOA Estimation and Positioning in Mobile Fading Environments," in IEEE Aerospace and Electronic Systems Magazine, vol. 37, No. 9, pp. 16-41, 1 Sep. 2022. (Year: 2022).*
(Continued)

*Primary Examiner* — William D Cumming
(74) *Attorney, Agent, or Firm* — Volpe Koenig

(57) ABSTRACT

A method and a device in a User Equipment (UE) and a base station are provided for wireless communication. The UE receives a target radio signal in a first frequency-domain resource, transmits a first radio signal, monitors a second radio signal in a first time window, and monitors a third radio signal in a first time-domain resource in the first frequency-domain resource. A channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

20 Claims, 10 Drawing Sheets

Related U.S. Application Data continuation of application No. 16/784,255, filed on Feb. 7, 2020, now Pat. No. 11,425,625, which is a continuation of application No. PCT/CN2017/096538, filed on Aug. 9, 2017.

(51) Int. Cl.

| | |
|---|---|
| *H04B 7/08* | (2006.01) |
| *H04W 24/08* | (2009.01) |
| *H04W 24/10* | (2009.01) |
| *H04W 72/0446* | (2023.01) |
| *H04W 72/0453* | (2023.01) |
| *H04W 88/06* | (2009.01) |
| *H04W 88/10* | (2009.01) |

(52) U.S. Cl.
CPC ........... *H04W 24/08* (2013.01); *H04W 24/10* (2013.01); *H04W 72/0446* (2013.01); *H04W 72/0453* (2013.01); *H04W 88/06* (2013.01); *H04W 88/10* (2013.01)

(58) Field of Classification Search
CPC . H04W 40/04; H04W 72/1215; H04W 72/02; H04W 72/1268
See application file for complete search history.

(56) References Cited

U.S. PATENT DOCUMENTS

| | | | | |
|---|---|---|---|---|
| 10,568,113 | B2 * | 2/2020 | Zhang | H04L 5/0023 |
| 10,581,505 | B2 | 3/2020 | Zhang | |
| 10,892,811 | B2 * | 1/2021 | Sadiq | H04B 7/06964 |
| 11,102,798 | B2 * | 8/2021 | Zhang | H04W 72/12 |
| 11,206,062 | B2 * | 12/2021 | Wu | H04L 1/0003 |
| 11,290,234 | B2 * | 3/2022 | Jiang | H04B 7/08 |
| 11,330,564 | B2 * | 5/2022 | Zhang | H04W 72/0453 |
| 11,349,553 | B2 * | 5/2022 | Zhou | H04W 72/53 |
| 11,374,710 | B2 * | 6/2022 | Zhang | H04W 72/0446 |
| 11,382,070 | B2 * | 7/2022 | Zhang | H04L 1/0003 |
| 11,382,090 | B2 * | 7/2022 | Kim | H04W 24/04 |
| 11,395,170 | B2 * | 7/2022 | Liu | H04L 1/0003 |
| 11,425,625 | B2 * | 8/2022 | Zhang | H04B 7/0413 |
| 11,533,139 | B2 * | 12/2022 | Zhang | H04L 5/0007 |
| 11,553,366 | B2 * | 1/2023 | Wu | H04W 72/0453 |
| 11,696,166 | B2 * | 7/2023 | Liu | H04W 72/0446 370/329 |
| 11,706,740 | B2 * | 7/2023 | Zhang | H04W 72/0453 370/330 |
| 11,722,997 | B2 * | 8/2023 | Zhang | H04W 72/0466 370/329 |
| 11,844,008 | B2 * | 12/2023 | Zhang | H04W 24/10 |
| 11,863,481 | B2 * | 1/2024 | Jiang | H04B 7/08 |
| 11,877,175 | B2 * | 1/2024 | Wu | H04L 5/00 |
| 12,003,448 | B2 * | 6/2024 | Zhang | H04L 5/0007 |
| 12,003,999 | B2 * | 6/2024 | Liu | H04W 72/0446 |
| 12,047,307 | B2 * | 7/2024 | Zhang | H04W 72/0453 |
| 12,057,916 | B2 * | 8/2024 | Zhang | H04B 7/088 |
| 12,192,970 | B2 * | 1/2025 | Zhang | H04W 72/1268 |
| 12,224,844 | B2 * | 2/2025 | You | H04L 5/001 |
| 12,526,029 | B2 * | 1/2026 | Li | H04B 7/06952 |
| 12,542,596 | B2 * | 2/2026 | Jang | H04B 7/06964 |
| 2017/0020384 | A1 | 1/2017 | Fitzgerald et al. | |
| 2019/0014587 | A1 * | 1/2019 | Zhang | H04W 72/12 |
| 2019/0020394 | A1 * | 1/2019 | Zhang | H04B 7/0695 |
| 2019/0053258 | A1 * | 2/2019 | Zhang | H04L 5/0055 |
| 2019/0081687 | A1 * | 3/2019 | Sadiq | H04B 7/06964 |
| 2020/0044714 | A1 | 2/2020 | Zhang | |
| 2020/0083935 | A1 * | 3/2020 | Wu | H04W 72/02 |
| 2020/0120686 | A1 * | 4/2020 | Zhang | H04L 1/0038 |
| 2020/0178151 | A1 * | 6/2020 | Zhang | H04W 24/08 |
| 2020/0229018 | A1 * | 7/2020 | Liu | H04L 1/00 |
| 2020/0229151 | A1 * | 7/2020 | Zhang | H04W 72/1268 |
| 2020/0313820 | A1 * | 10/2020 | Jiang | H04L 5/0048 |
| 2020/0412501 | A1 * | 12/2020 | Zhang | H04L 5/0007 |
| 2021/0029673 | A1 * | 1/2021 | Zhang | H04L 1/1819 |
| 2021/0045002 | A1 * | 2/2021 | Wu | H04W 72/0453 |
| 2021/0152235 | A1 * | 5/2021 | Zhou | H04B 7/088 |
| 2021/0235425 | A1 * | 7/2021 | Kim | H04W 24/04 |
| 2021/0367723 | A1 * | 11/2021 | Zhang | H04W 72/0453 |
| 2022/0140881 | A1 * | 5/2022 | Zhang | H04L 5/0051 370/329 |
| 2022/0149926 | A1 * | 5/2022 | You | H04W 76/19 |
| 2022/0173861 | A1 * | 6/2022 | Jiang | H04L 5/0023 |
| 2022/0217685 | A1 * | 7/2022 | Zhang | H04W 72/1268 |
| 2022/0278800 | A1 * | 9/2022 | Zhang | H04L 5/0094 |
| 2022/0303816 | A1 * | 9/2022 | Liu | H04L 5/0094 |
| 2022/0322303 | A1 * | 10/2022 | Zhang | H04L 1/0003 |
| 2022/0345976 | A1 * | 10/2022 | Zhang | H04B 7/0617 |
| 2023/0055350 | A1 * | 2/2023 | Wu | H04L 5/0048 |
| 2023/0074940 | A1 * | 3/2023 | Zhang | H04L 5/0007 |
| 2023/0156721 | A1 * | 5/2023 | Li | H04B 7/06952 370/329 |
| 2023/0284067 | A1 * | 9/2023 | Liu | H04L 5/0094 370/329 |
| 2023/0397169 | A1 * | 12/2023 | Zhang | H04W 72/0453 |
| 2023/0413235 | A1 * | 12/2023 | Hu | H04W 72/02 |
| 2024/0073774 | A1 * | 2/2024 | Zhang | H04W 72/0446 |
| 2024/0089777 | A1 * | 3/2024 | Wu | H04W 24/10 |
| 2024/0259843 | A1 * | 8/2024 | Zhu | H04W 72/1273 |
| 2024/0380649 | A1 * | 11/2024 | Zhou | H04W 76/19 |
| 2024/0396613 | A1 * | 11/2024 | Li | H04B 7/06964 |
| 2025/0119894 | A1 * | 4/2025 | Kwon | H04B 7/088 |

FOREIGN PATENT DOCUMENTS

| | | | | | |
|---|---|---|---|---|---|
| CN | 105322992 | A | | 2/2016 | |
| CN | 105792225 | A | | 7/2016 | |
| CN | 105848292 | A | | 8/2016 | |
| CN | 106162746 | A | | 11/2016 | |
| CN | 106304148 | A | | 1/2017 | |
| CN | 106559120 | A | | 4/2017 | |
| CN | 109391300 | A | * | 2/2019 | ........ H04W 72/1215 |
| CN | 110915145 | A | * | 3/2020 | ............ H04W 40/04 |
| CN | 111108698 | A | * | 5/2020 | .............. H04B 7/06 |
| CN | 111345054 | A | * | 6/2020 | .......... H04L 5/0032 |
| CN | 109391300 | B | * | 1/2021 | ........ H04W 72/1215 |
| CN | 112600653 | A | * | 4/2021 | .......... H04L 5/0053 |
| CN | 110915145 | B | * | 4/2023 | ........ H04W 72/0446 |
| CN | 116056141 | A | * | 5/2023 | ........ H04W 72/0446 |
| CN | 116193497 | A | * | 5/2023 | .......... H04B 7/0617 |
| CN | 116095703 | B | * | 7/2024 | .......... H04W 16/28 |
| EP | 2639994 | A2 | | 9/2013 | |
| EP | 3113571 | A1 | | 1/2017 | |
| EP | 3678299 | A1 | | 7/2020 | |
| EP | 3806559 | A1 | * | 4/2021 | ........ H04W 72/0446 |
| EP | 3917361 | A1 | | 12/2021 | |
| EP | 4280524 | A1 | * | 11/2023 | .......... H04L 5/0055 |
| EP | 3806559 | B1 | * | 3/2025 | ........ H04W 72/0453 |
| WO | 2011118141 | A1 | | 7/2013 | |
| WO | 2015160170 | A1 | | 10/2015 | |
| WO | 2014045322 | A1 | | 8/2016 | |
| WO | 2017020384 | A1 | | 2/2017 | |
| WO | 2017080472 | A1 | | 5/2017 | |
| WO | WO-2019028687 | A1 | * | 2/2019 | ........... H04W 40/04 |
| WO | WO-2019119197 | A1 | * | 6/2019 | ........... H04L 5/0032 |

OTHER PUBLICATIONS

CN201780092996.5 First Office Action dated Jun. 24, 2022.
CN201780092996.5 First Search Report dated Jun. 14, 2022.
ISR received in application No. PCT/CN2017/096538 dated Apr. 26,2018.
Notification to Grant Patent Right for Invention of Chinese patent application No. CN201780092996.5 dated Dec. 16, 2022.
Arslan et al., "Cognitive Radio and Software Defined Radio: Signal Processing Perspectives," IEEE Signal Processing, Communication and Applications Conference (Sep. 2008).
Kargas et al., "Positioning in LTE," in Handbook of Position Location: Theory, Practice, and Advances, pp. 1165-1218 (2019).

(56) References Cited

OTHER PUBLICATIONS

LG Electronics Inc., "Considerations on multiple beam operation for NR-U," 3GPP TSG-RAN WG2 #103, R2-1812867, Gothenburg, Sweden (Aug. 20-24, 2018).

Samsung, "Robust Design to Support Various Spectrums in NR," 3GPP TSG-RAN WG2 #95, R2-165174, Gothenburg, Sweden (Aug. 22-26, 2016).

Third Generation Partnership Project, "Technical Specification Group Radio Access Network; Evolved Universal Terrestrial Radio Access (E-UTRA); Physical layer procedures (Release 14)," 3GPP TS 36.213 V14.3.0 (Jun. 2017).

Third Generation Partnership Project, "Technical Specification Group Radio Access Network; Evolved Universal Terrestrial Radio Access (E-UTRA); Physical layer; Measurements (Release 14)," 3GPP TS 36.214 V14.2.0 (Mar. 2017).

Third Generation Partnership Project, "Technical Specification Group Radio Access Network; NR; Physical channels and modulation (Release 15)," 3GPP TS 38.211 V0.1.0 (Jun. 2017).

Third Generation Partnership Project, "Technical Specification Group Radio Access Network; NR; Multiplexing and channel coding (Release 15)," 3GPP TS 38.212 V0.0.0 (May 2017).

Third Generation Partnership Project, "Technical Specification Group Radio Access Network; NR; Medium Access Control (MAC) protocol specification (Release 15)," 3GPP TS 38.321 V0.0.4 (Jun. 2017).

Third Generation Partnership Project, "Technical Specification Group Radio Access Network; NR; Radio Resource Control (RRC); Protocol specification (Release 15)," 3GPP TS 38.331 V0.0.4 (Jun. 2017).

Wild et al., "Joint Design of Communication and Sensing for Beyond 5G and 6G Systems," IEEE Access, vol. 9, p. 30845-30857 (2021).

* cited by examiner

Time intervals in first
time-domain resource

Target Time Interval: time interval #n

METHOD AND DEVICE FOR CHANNEL-MEASUREMENT-TRIGGERED UPLINK SIGNALING AND DOWNLINK CONTROL MONITORING

CROSS REFERENCE TO RELATED APPLICATION

This application is the continuation of the U.S. patent application Ser. No. 17/860,109, filed on Jul. 8, 2022, which is the continuation of the U.S. patent application Ser. No. 16/784,255, filed on Feb. 7, 2020, and is the continuation of International Patent Application No. PCT/CN2017/096358, filed on Aug. 9, 2017, and claims the priority benefit of International Patent Application No. PCT/CN2017/096358, filed on Aug. 9, 2017, the full disclosure of which is incorporated herein by reference.

BACKGROUND

Technical Field

The disclosure relates to transmission schemes of radio signals in wireless communication systems, and in particular to a method and a device for a User Equipment (UE) to autonomously determine transmission of information.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication.

In discussions about 3rd Partner Project (3GPP) New Radio, some companies propose that a UE should conduct a measurement on a service beam during the communication process and that, when the quality of the service beam is found degraded, a Physical Uplink Control Channel (PUCCH) should be used by the UE to transmit a beam recovery request to a base station, which then changes the service beam.

SUMMARY

The inventor finds through researches that in License-Assisted Access (LAA) systems, transmissions of beam recovery requests and responses to the beam recovery requests on unlicensed spectrum could have problems such as request latency and response latency because a Listen Before Talk (LBT) needs to be performed before a transmission.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for wireless communication, wherein the method includes:

receiving a target radio signal in a first frequency-domain resource;

transmitting a first radio signal;

monitoring a second radio signal in a first time window; and monitoring a third radio signal in a first time-domain resource in the first frequency-domain resource.

Herein, a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the above method has the following benefits: a beam recovery request for an unlicensed frequency band is transmitted on a licensed frequency band, thereby reducing latencies of the beam recovery request and a response to the beam recovery request.

In one embodiment, the above method is applied to the beam recovery on an unlicensed frequency band in LAA systems.

In one embodiment, the phrase determining means explicitly indicating.

In one embodiment, the phrase determining means implicitly indicating.

In one embodiment, the first frequency-domain resource is deployed on unlicensed spectrum.

In one embodiment, the first frequency-domain resource is deployed on 5 GHz unlicensed spectrum.

In one embodiment, the first frequency-domain resource is deployed on 60 GHz unlicensed spectrum.

In one embodiment, the first frequency-domain resource includes one carrier.

In one embodiment, the UE performs an LBT before transmitting a radio signal in the first frequency-domain resource.

In one embodiment, the base station performs an LBT before transmitting a radio signal in the first frequency-domain resource.

In one embodiment, the target radio signal is a multicarrier symbol in the first frequency domain resource, on which a PDCCH (Physical Downlink Control Channel) is located.

In one embodiment, the target radio signal is transmitted on a physical layer control channel (that is, a physical layer channel capable of transmitting control information only).

In one embodiment, the target radio signal carries one piece of Downlink Control Information (DCI).

In one embodiment, the target radio signal is an Orthogonal Frequency Division Multiplexing (OFDM) symbol in the first frequency-domain resource, on which a PDCCH is located.

In one embodiment, the target radio signal is transmitted on a physical layer data channel (that is, a physical layer channel capable of transmitting data information only) or a physical layer shared channel (that is, a physical layer channel capable of transmitting data or control information).

In one embodiment, the target radio signal is a multicarrier symbol in the first frequency-domain resource, on which a PDSCH (Physical Downlink Shared Channel) is located.

In one embodiment, the target radio signal is an OFDM symbol in the first frequency-domain resource, on which a PDCCH is located.

In one embodiment, the target radio signal is a reference signal in the first frequency-domain resource.

In one embodiment, the target radio signal is a PDCCH in the first frequency-domain resource.

In one embodiment, the target radio signal is a PDSCH in the first frequency-domain resource.

In one embodiment, the target radio signal is a physical layer control channel in the first frequency-domain resource.

In one embodiment, the target radio signal is a data channel in the first frequency-domain resource.

In one embodiment, the target radio signal is a Demodulation Reference Signal (DMRS) of a PDCCH in the first frequency-domain resource.

In one embodiment, the target radio signal is a DMRS of a PDSCH in the first frequency-domain resource.

In one embodiment, the target radio signal is a Channel State Information Reference Signal (CSI-RS) in the first frequency-domain resource.

In one embodiment, the target radio signal is a CSI-RS for a channel quality measurement of a PDCCH in the first frequency-domain resource.

In one embodiment, the target radio signal is a Synchronization Signal (SS).

In one embodiment, the target radio signal is a SS for a channel quality measurement of a PDCCH.

In one embodiment, the target radio signal is a reference signal for a channel quality measurement of a PDSCH.

In one embodiment, the target radio signal is a Discovery Reference Signal (DRS).

In one embodiment, a multiantenna related transmission of a PDCCH in the first frequency-domain resource is related to a multiantenna related transmission of the target radio signal.

In one embodiment, a transmitting beam used for transmitting a PDCCH in the first frequency-domain resource is used for transmitting the target radio signal.

In one embodiment, a multiantenna related reception of a PDCCH in the first frequency-domain resource is related to a multiantenna related reception of the target radio signal.

In one embodiment, a receiving beam used for receiving a PDCCH in the first frequency-domain resource is used for receiving the target radio signal.

In one embodiment, an antenna port used for transmitting a PDCCH in the first frequency-domain resource is spatially related to an antenna port used for transmitting the target radio signal.

In one embodiment, an antenna port used for transmitting a PDCCH in the first frequency-domain resource is spatially QCLed with an antenna port used for transmitting the target radio signal.

In one embodiment, a multiantenna related transmission of a PDSCH in the first frequency-domain resource is related to a multiantenna related transmission of the target radio signal.

In one embodiment, a transmitting beam used for transmitting a PDSCH in the first frequency-domain resource is used for transmitting the target radio signal.

In one embodiment, a multiantenna related reception of a PDSCH in the first frequency-domain resource is related to a multiantenna related reception of the target radio signal.

In one embodiment, a receiving beam used for receiving a PDSCH in the first frequency-domain resource is used for receiving the target radio signal.

In one embodiment, an antenna port used for transmitting a PDSCH in the first frequency-domain resource is spatially related to an antenna port used for transmitting the target radio signal.

In one embodiment, an antenna port used for transmitting a PDSCH in the first frequency-domain resource is spatially QCLed with an antenna port used for transmitting the target radio signal.

In one embodiment, the multiantenna related transmission refers to a transmitting beam.

In one embodiment, the multiantenna related transmission refers to an analog transmitting beam.

In one embodiment, the multiantenna related reception refers to a receiving beam.

In one embodiment, the multiantenna related reception refers to an analog receiving beam.

In one embodiment, the phrase spatially related means to use a same analog beam to transmit signalings or data.

In one embodiment, the phrase spatially related means Quasi Co-Located (QCLed).

In one embodiment, the phrase spatially related means spatially QCLed.

In one embodiment, the phrase spatially related means that channel properties are the same or approximate.

In one embodiment, the phrase spatially related means that at least one of delay spread, Doppler spread, Doppler shift, average angle of departure or average angle of arrival is the same or approximate.

In one embodiment, the phrase approximate means that a difference between two properties is less than a first threshold.

In one embodiment, the first threshold is default.

In one embodiment, the first threshold is preconfigured.

In one embodiment, the first threshold is configured by a base station.

In one embodiment, the transmitting beam is an analog transmitting beam.

In one embodiment, a transmitting beamforming vector is used for forming a transmitting beam.

In one embodiment, the receiving beam is an analog receiving beam.

In one embodiment, a receiving beamforming vector is used for forming a receiving beam.

In one embodiment, the beam is an analog beam.

In one embodiment, the analog beam refers to a beam formed by applying a beamforming vector to a phase shifter at an RF part of an equipment.

In one embodiment, the analog beam is formed by applying an analog beamforming vector to a simulator.

In one embodiment, the antenna port is formed by multiple physical antennas through antenna virtualization superposition. Mapping coefficients from the antenna port to the multiple physical antennas form beamforming vectors, which are used for the antenna virtualization to form a beam.

In one embodiment, one antenna port is used for transmitting one reference signal.

In one embodiment, different antenna ports are used for transmitting different reference signals.

In one embodiment, one antenna port group includes one antenna port only.

In one embodiment, one antenna port group includes multiple antenna ports.

In one embodiment, antenna ports in one antenna port group are spatially related.

In one embodiment, antenna ports in one antenna port group are spatially QCLed.

In one embodiment, a same analog beam is used for forming the antenna ports in one antenna port group.

In one embodiment, the first radio signal is transmitted in the first frequency-domain resource.

In one embodiment, the first radio signal is transmitted in the first frequency-domain resource, and the UE performs an LBT before transmitting the first radio signal.

In one embodiment, the first radio signal is transmitted on licensed spectrum.

In one embodiment, the first radio signal is transmitted in a second frequency-domain resource, and the first frequency-domain resource does not include the second frequency-domain resource.

In one embodiment, the first frequency-domain resource is on a first subcarrier, the first radio signal is transmitted on a second subcarrier, the first subcarrier and the second subcarrier are two subcarriers with different frequency-domain resources.

In one embodiment, the first radio signal and the second radio signal are transmitted in the first frequency-domain resource.

In one embodiment, the first radio signal is used for determining a beam recovery request for the first frequency-domain resource.

In one embodiment, the first radio signal is used for determining a scheduling request for the first frequency-domain resource.

In one embodiment, a second bit block is processed through channel coding to generate the first radio signal.

In one embodiment, a value of the second bit block is used for determining a beam recovery request.

In one embodiment, a value of the second bit block is used for determining a scheduling request.

In one embodiment, the first radio signal is transmitted on a physical layer control channel.

In one embodiment, the first radio signal is one PUCCH.

In one embodiment, an air-interface resource occupied by the first radio signal is used for determining a beam recovery request.

In one embodiment, an air-interface resource occupied by the first radio signal is used for determining a scheduling request.

In one embodiment, the air-interface resource refers to at least one of time-domain resources, frequency-domain resource or code-domain resources.

In one embodiment, the monitoring refers to blind decoding.

In one embodiment, the monitoring refers that it is not sure whether transmission has been performed before successful decoding.

In one embodiment, the monitoring refers that it is not sure whether transmission has been performed before successful detection.

In one embodiment, the second radio signal is transmitted in the first frequency-domain resource.

In one embodiment, the second radio signal is transmitted on licensed spectrum.

In one embodiment, the second radio signal and the first radio signal are transmitted on a same subcarrier.

In one embodiment, the UE monitors the second radio signal on a subcarrier on which the first radio signal is located.

In one embodiment, the second radio signal is used for determining a response to the first radio signal.

In one embodiment, the second radio signal is one PDCCH.

In one embodiment, the second radio signal includes one DCI.

In one embodiment, the second radio signal is cell specific.

In one embodiment, the second radio signal is terminal group specific, and the terminal group includes multiple terminals.

In one embodiment, the second radio signal carries a first physical layer signaling.

In one embodiment, the first physical layer signaling is marked by a Common Control Radio Network Temporary Identity (CC-RNTI).

In one embodiment, the second radio signal is transmitted on a physical layer control channel (that is, a physical layer channel capable of transmitting control information only).

In one embodiment, a time-domain resource occupied by the first radio signal is used for determining a start of the first time window.

In one embodiment, a time-domain resource occupied by the first radio signal is used for determining an end of the first time window.

In one embodiment, a length of the first time window is configured by default.

In one embodiment, a length of the first time window is preconfigured.

In one embodiment, a length of the first time window is configured by a base station.

In one embodiment, a receiver of the first radio signal transmits the second radio signal within a third time window after correctly receiving the first radio signal, and the third time window is not greater than the first time window.

In one embodiment, the UE does not monitor the third radio signal in time-domain resources other than the first time-domain resource.

In one embodiment, the third radio signal is one PDCCH.

In one embodiment, the third radio signal includes one DCI.

In one embodiment, the third radio signal is cell specific.

In one embodiment, the third radio signal is terminal group specific, and the terminal group includes multiple terminals.

In one embodiment, the third radio signal carries a first physical layer signaling.

In one embodiment, the first physical layer signaling is marked by a CC-RNTI.

In one embodiment, the third radio signal is transmitted on a physical layer control channel (that is, a physical layer channel capable of transmitting control information only).

In one embodiment, the third radio signal is used for determining a scheduling of downlink transmission.

In one embodiment, the third radio signal is terminal specific.

In one embodiment, the third radio signal carries a second physical layer signaling.

In one embodiment, the second physical layer signaling is used for scheduling data transmission.

In one embodiment, the second physical layer signaling is used for scheduling a downlink PDSCH.

In one embodiment, the second physical layer signaling is used for determining at least one of downlink time-domain resources, downlink frequency-domain resources, a Modulation and Coding Scheme (MCS), a Hybrid Automatic Repeat reQuest (HARD) process number, a new data indicator, a redundancy version, a transmit power control of a PUCCH or a multiantenna related reception of a downlink PDSCH.

In one embodiment, the second physical layer signaling is used for scheduling an uplink PUSCH.

In one embodiment, the second physical layer signaling is used for determining at least one of uplink time-domain resources, uplink frequency-domain resources, a frequency hopping mode, an MCS, a redundancy version, a new data indicator, an uplink DMRS configuration or a CSI request.

In one embodiment, the third radio signal is transmitted on a physical layer control channel (that is, a physical layer channel capable of transmitting control information only).

In one embodiment, time-domain resources in the first time-domain resource are consecutive.

In one embodiment, time-domain resources in the first time-domain resource are inconsecutive.

In one embodiment, a channel measurement for the target radio signal obtains a target measurement value.

In one embodiment, the target measurement value, which is lower than a target threshold, is used for triggering the first radio signal.

In one embodiment, the target measurement value refers to one of a Reference Signal Receiver Power (RSRP), a Signal-to-Noise Ratio (SNR) or a Signal-to-Interference-plus-Noise Ratio (SINR) obtained after a measurement is performed on the target radio signal.

In one embodiment, the target measurement value refers to one of an equivalent RSRP, an equivalent SNR or an equivalent SINR obtained after the target radio signal is mapped to a physical layer control channel.

In one embodiment, the target measurement value, which is higher than a target threshold, is used for triggering the first radio signal. The target measurement value refers to one of a Bit Error Rate (BER) or a Block Error Rate (BLER) obtained after the target radio signal is mapped to a physical layer control channel.

In one embodiment, the target measurement value is used for determining a quality of a channel through which the target radio signal passes.

In one embodiment, the target measurement value is used for determining a channel quality of a PDCCH corresponding to the target radio signal.

In one embodiment, the first radio signal is used for determining a transmitting beam used for transmitting the third radio signal.

In one embodiment, the first radio signal is used for determining a first antenna port group. An antenna port group used for transmitting the third radio signal is spatially related to the first antenna port group.

In one embodiment, an analog transmitting beam used for forming the first antenna port group is used for transmitting the third radio signal.

In one embodiment, an analog receiving beam used for receiving the first antenna port group is used for receiving the third radio signal.

In one embodiment, the first antenna port group is used for transmitting a downlink reference signal.

In one embodiment, the first antenna port group is used for transmitting a CSI-RS.

In one embodiment, the first antenna port group is used for transmitting a SS.

In one embodiment, the first antenna port group is used for transmitting a DRS.

In one embodiment, the first antenna port group is spatially unrelated to an antenna port used for transmitting the second radio signal.

In one embodiment, the first antenna port group is spatially unrelated to an antenna port used for transmitting the target radio signal.

In one embodiment, the phrase spatially unrelated means spatially non-QCLed.

In one embodiment, the phrase spatially unrelated means to use different analog beams.

In one embodiment, the phrase spatially unrelated means that at least one of delay spread, Doppler spread, Doppler shift, average angle of departure or average angle of arrival is not approximate.

In one embodiment, the phrase not approximate means that a difference between two properties is higher than a second threshold.

In one embodiment, the second threshold is default.

In one embodiment, the second threshold is preconfigured.

In one embodiment, the second threshold is configured by a base station.

In one embodiment, the second radio signal is used for determining a second antenna port group. The second antenna port group is spatially related to an antenna port used for transmitting the third radio signal.

In one embodiment, the second antenna port group is used for transmitting a downlink reference signal.

In one embodiment, the second antenna port group is used for transmitting a CSI-RS.

In one embodiment, the second antenna port group is used for transmitting a SS.

In one embodiment, an air-interface resource occupied by the first radio signal is used for determining a multiantenna related transmission of the third radio signal.

In one embodiment, a third bit block is processed through channel coding to generate the first radio signal, and a value of the third bit block is used for determining a multiantenna related transmission of the third radio signal.

In one embodiment, an air-interface resource occupied by the second radio signal is used for determining the first time-domain resource.

In one embodiment, a time-domain resource occupied by the second radio signal is used for determining the first time-domain resource.

In one embodiment, an offset between a start of the first time-domain resource and a time-domain resource occupied by the second radio signal is preconfigured.

In one embodiment, an offset between a start of the first time-domain resource and a time-domain resource occupied by the second radio signal is configured by default.

In one embodiment, an offset between a start of the first time-domain resource and a time-domain resource occupied by the second radio signal is configured by a base station.

In one embodiment, an air-interface resource occupied by the second radio signal is used for determining the first time-domain resource.

In one embodiment, the second radio signal indicates the first time-domain resource.

In one embodiment, the first time-domain resource is a result obtained after a base station performs an LBT.

In one embodiment, a first bit block is processed through channel coding to generate the second radio signal, and the first bit block is used for determining the first time-domain resource.

In one embodiment, a receiver of the first radio signal transmits the second radio signal after correctly receiving the first radio signal.

In one embodiment, a receiver of the first radio signal is supposed to transmit the second radio signal after correctly receiving the first radio signal.

In one embodiment, a receiver of the first radio signal transmits the second radio signal after correctly decoding the first radio signal.

According to one aspect of the disclosure, a time-domain resource occupied by the first radio signal is used for determining at least one of a start of the first time window or an end of the first time window.

In one embodiment, the above method has the following benefit: signaling overheads are reduced.

In one embodiment, a time-domain resource occupied by the first radio signal indicates explicitly at least one of a start of the first time window or an end of the first time window.

In one embodiment, a time-domain resource occupied by the first radio signal indicates implicitly at least one of a start of the first time window or an end of the first time window.

In one embodiment, a start of the first time window is a time-domain resource where the first radio signal is located.

In one embodiment, a start of the first time window is a time-domain resource where the first radio signal is located plus a first offset.

In one embodiment, the first offset is preconfigured.

In one embodiment, the first offset is configured by default.

In one embodiment, the first offset is configured by a base station.

In one embodiment, an end of the first time window is a time-domain resource where the first radio signal is located plus a second offset.

In one embodiment, the second offset is preconfigured.

In one embodiment, the second offset is configured by default.

In one embodiment, the second offset is configured by a base station.

According to one aspect of the disclosure, the second radio signal is used for determining the first time-domain resource, and the first time-domain resource is one time window In one embodiment, the above method has the following benefit: the flexibility of system scheduling is improved.

In one embodiment, time-domain resources occupied by the first time-domain resource are consecutive.

In one embodiment, the second radio signal is used for determining a start of the first time-domain resource.

In one embodiment, the second radio signal is used for determining an end of the first time-domain resource.

According to one aspect of the disclosure, the second radio signal is used for determining whether a target time interval belongs to the first time-domain resource.

In one embodiment, the above method has the following benefit: signals after beam switch may be monitored in inconsecutive time-domain resources.

In one embodiment, an LBT is used for determining the target time interval.

In one embodiment, a base station detects that a signal energy received in the first frequency-domain resource is lower than a third threshold before the third radio signal is transmitted.

In one embodiment, the third threshold is in unit of dBm.

In one embodiment, the third threshold is −72 dBm.

In one embodiment, the third threshold is configured by default.

In one embodiment, the third threshold is configured by a base station.

In one embodiment, the first frequency-domain resource has a wideband of 20 MHz.

In one embodiment, the first frequency-domain resource has a wideband of 2.16 GHz.

In one embodiment, the second radio signal is used for determining that a transmitter of the target radio signal can transmit a radio signal in the target time interval.

In one embodiment, the target time interval has a duration not greater than 1 ms.

In one embodiment, the target time interval is behind a time-domain resource occupied by the second radio signal.

In one embodiment, a first time is behind a second time, a time interval between the first time and the second time is not greater than 2 ms, the first time and the second time are an end of the target time interval and an end of a time-domain resource occupied by the second radio signal respectively.

In one embodiment, the first time-domain resource includes N time intervals, the target time interval is one of the N time intervals, and the N is a positive integer greater than 1.

In one embodiment, a time-domain resource occupied by the second radio signal is used for determining the target time-domain interval.

In one embodiment, a time-domain resource occupied by the second radio signal is used for determining at least one of a start of the target time interval or an end of the target time interval.

In one embodiment, a value of a bit block which generates the second radio signal through channel coding is used for determining the target time interval.

According to one aspect of the disclosure, the method includes: receiving a first signaling.

Herein, the first signaling is used for determining a length of the first time window.

In one embodiment, the above method has the following benefit: the flexibility of system configuration is improved.

In one embodiment, the first signaling is transmitted on a physical layer control channel.

In one embodiment, the first signaling is a higher-layer signaling.

In one embodiment, the first signaling is transmitted on a physical layer shared channel.

In one embodiment, the first time window is in unit of slot.

In one embodiment, the first time window is in unit of subframe.

In one embodiment, the first time window is in unit of multicarrier symbol.

According to one aspect of the disclosure, the method includes:

transmitting the first radio signal again; and monitoring the second radio signal in a second time window.

Herein, the second radio signal is not correctly received in the first time window.

In one embodiment, the above method has the following benefit: through the repeated transmission after the first time window, the robustness of transmission of the beam recovery request is improved.

In one embodiment, the second radio signal is not transmitted.

In one embodiment, the first radio signal is not correctly received; therefore, the second radio signal is not transmitted.

In one embodiment, the second radio signal is not correctly decoded.

In one embodiment, the second radio signal is not detected.

In one embodiment, a time resource occupied by the first radio signal transmitted again is used for determining the second time window.

In one embodiment, a time resource occupied by the first radio signal transmitted again is used for determining at least one of a start of the second time window or an end of the second time window.

In one embodiment, the first time window and the second time window have an equal length in time domain.

In one embodiment, the first time window and the second time window have unequal lengths in time domain.

According to one aspect of the disclosure, the second radio signal is used for determining a multiantenna related reception used for monitoring the third radio signal.

In one embodiment, the above method has the following benefit: the flexibility of scheduling of system beams is improved.

In one embodiment, an air-interface resource occupied by the second radio signal is used for determining a multiantenna related reception used for monitoring the third radio signal.

In one embodiment, a value of a bit block which generates the second radio signal through channel coding is used for determining a multiantenna related reception used for monitoring the third radio signal.

The disclosure provides a method in a base station for wireless communication, wherein the method includes:

transmitting a target radio signal in a first frequency-domain resource;

receiving a first radio signal;

transmitting a second radio signal in a first time window; and transmitting a third radio signal in a first time-domain resource in the first frequency-domain resource.

Herein, a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the base station performs an LBT before performing transmission in the first frequency-domain resource.

According to one aspect of the disclosure, a time-domain resource occupied by the first radio signal is used for determining at least one of a start of the first time window or an end of the first time window.

According to one aspect of the disclosure, the second radio signal is used for determining the first time-domain resource, and the first time-domain resource is one time window.

According to one aspect of the disclosure, the second radio signal is used for determining whether a target time interval belongs to the first time-domain resource.

According to one aspect of the disclosure, the method includes:

transmitting a first signaling.

Herein, the first signaling is used for determining a length of the first time window.

According to one aspect of the disclosure, the method includes:

receiving the first radio signal again.

Herein, the second radio signal is not correctly received in the first time window.

In one embodiment, before receiving the first radio signal again, the base station does not correctly receive the transmission of the previous first radio signal; and the base station receives the first radio signal again, and transmits the second radio signal after correct decoding of the first radio signal.

In one embodiment, before receiving the first radio signal again, the base station has transmitted the second radio signal, but the UE does not correctly receive the second radio signal, then the base station receives the first radio signal again, and transmits the second radio signal again after correct decoding of the first radio signal.

According to one aspect of the disclosure, the second radio signal is used for determining a multiantenna related reception used for monitoring the third radio signal.

The disclosure provides a UE for wireless communication, wherein the UE includes:

a UE processing device, to receive a target radio signal in a first frequency-domain resource; to transmit a first radio signal; to monitor a second radio signal in a first time window; and to monitor a third radio signal in a first time-domain resource in the first frequency-domain resource.

Herein, a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the above UE is characterized in that: a time-domain resource occupied by the first radio signal is used for determining at least one of a start of the first time window or an end of the first time window.

In one embodiment, the above UE is characterized in that: the second radio signal is used for determining the first time-domain resource, and the first time-domain resource is one time window.

In one embodiment, the above UE is characterized in that: the second radio signal is used for determining whether a target time interval belongs to the first time-domain resource.

In one embodiment, the above UE is characterized in that: the UE processing device receives a first signaling; wherein the first signaling is used for determining a length of the first time window.

In one embodiment, the above UE is characterized in that: the UE processing device transmits the first radio signal again; and the UE processing device monitors the second radio signal in a second time window; wherein the second radio signal is not correctly received in the first time window.

In one embodiment, the above UE is characterized in that: the second radio signal is used for determining a multiantenna related reception used for monitoring the third radio signal.

The disclosure provides a base station for wireless communication, wherein the base station includes:

a BS processing device, to transmit a target radio signal in a first frequency-domain resource; to receive a first radio signal; to transmit a second radio signal in a first time window; and to transmit a third radio signal in a first time-domain resource in the first frequency-domain resource.

Herein, a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the above base station is characterized in that: a time-domain resource occupied by the first radio signal is used for determining at least one of a start of the first time window or an end of the first time window.

In one embodiment, the above base station is characterized in that: the second radio signal is used for determining the first time-domain resource, and the first time-domain resource is one time window.

In one embodiment, the above base station is characterized in that: the second radio signal is used for determining whether a target time interval belongs to the first time-domain resource.

In one embodiment, the above base station is characterized in that: the BS processing device transmits a first signaling; wherein the first signaling is used for determining a length of the first time window.

In one embodiment, the above base station is characterized in that: the BS processing device receives the first radio signal again; and the BS processing device transmits the second radio signal in a second time window; wherein the second radio signal is not correctly received in the first time window.

In one embodiment, the above base station is characterized in that: the second radio signal is used for determining a multiantenna related reception used for monitoring the third radio signal.

In one embodiment, compared with the prior art, the disclosure has the following technical advantages.

Latencies of transmissions of beam recovery requests for unlicensed spectrum are reduced.

Latencies of responses to beam recovery requests for unlicensed spectrum are reduced.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
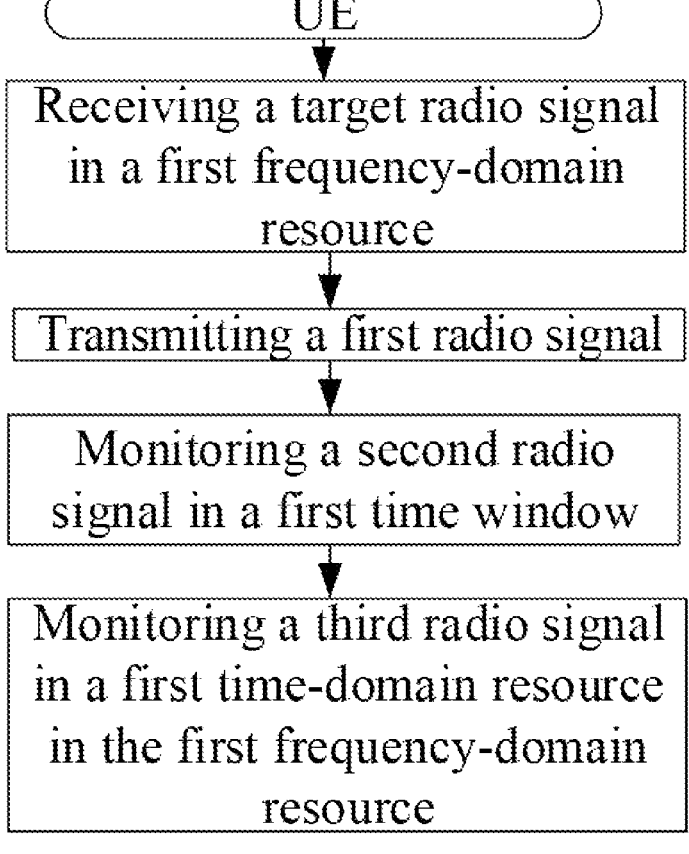
FIG. 1 is a flowchart of a target radio signal, a first radio signal, a second radio signal and a third radio signal according to one embodiment of the disclosure.

Embodiment 1 illustrates an example of a flowchart of a target radio signal, a first radio signal, a second radio signal and a third radio signal according to the disclosure, as shown in FIG. 1. In FIG. 1, each box represents one step. In Embodiment 1, the UE in the disclosure, in turn, receives a target radio signal in a first frequency-domain resource, transmits a first radio signal, monitors a second radio signal in a first time window, and monitors a third radio signal in a first time-domain resource in the first frequency-domain resource; wherein a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one subembodiment, the first frequency-domain resource is deployed on unlicensed spectrum.

In one subembodiment, licensed spectrum is used for transmitting the first radio signal and the second radio signal.

In one subembodiment, the target radio signal is used for a channel quality measurement for a physical layer control channel transmitted in the first frequency-domain resource.

In one subembodiment, the target radio signal is a downlink reference signal used for a channel measurement.

In one subembodiment, a result of the channel measurement is lower than a target threshold, and a transmission of the first radio signal is triggered.

In one subembodiment, the first radio signal is a beam recovery request.

In one subembodiment, an uplink physical layer control channel is used for transmitting the first radio signal.

In one subembodiment, a time-domain resource occupied by the first radio signal is used for determining the first time window.

In one subembodiment, the second radio signal is used for determining that the first radio signal is correctly received.

In one subembodiment, the second radio signal is used for determining that the first radio signal is correctly decoded.

In one subembodiment, the second radio signal is used for determining the first time-domain resource, and the first time-domain resource is inconsecutive.

In one subembodiment, the first time-domain resource includes multiple time intervals, and the second radio signal is used for determining one of the multiple time intervals.

In one subembodiment, the first radio signal is used for determining a first antenna port group. An antenna port group used for transmitting the third radio signal is spatially QCLed with the first antenna port group. The first antenna port group is used for transmitting a CSI-RS.

In one subembodiment, an analog transmitting beam used for forming the first antenna port group is used for transmitting the third radio signal.

In one subembodiment, an analog receiving beam used for receiving the first antenna port group is used for receiving the third radio signal.

Embodiment 2

Figure 2:
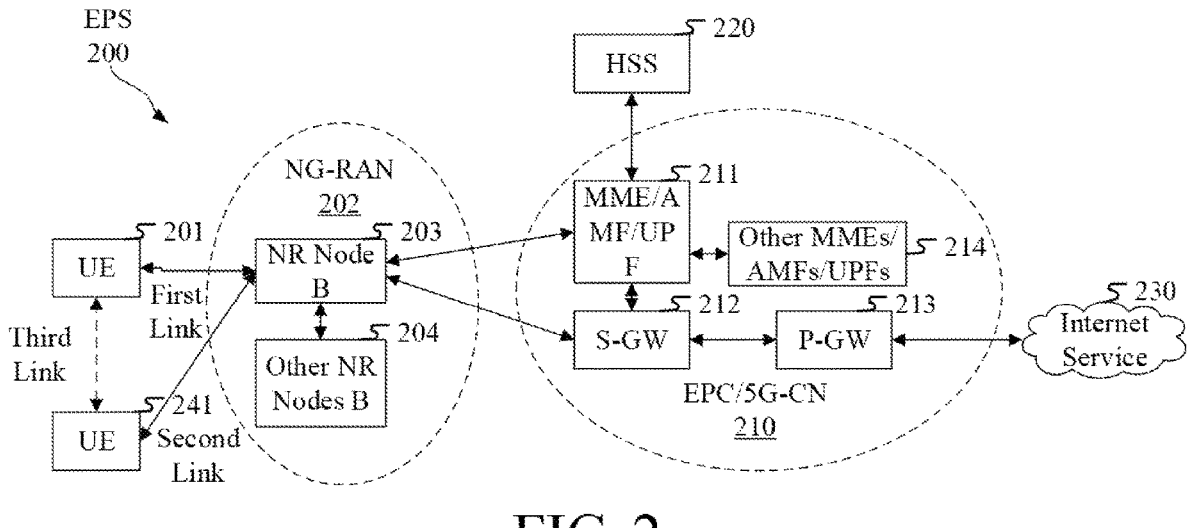
FIG. 2 is a diagram illustrating a network architecture according to one embodiment of the disclosure.

Embodiment 2 illustrates an example of a diagram of a network architecture, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/ 5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports multiantenna transmission.

In one subembodiment, the UE 201 supports analog beamforming.

In one subembodiment, the gNB 203 supports multiantenna transmission.

In one subembodiment, the gNB 203 supports analog beamforming.

Embodiment 3

Figure 3:
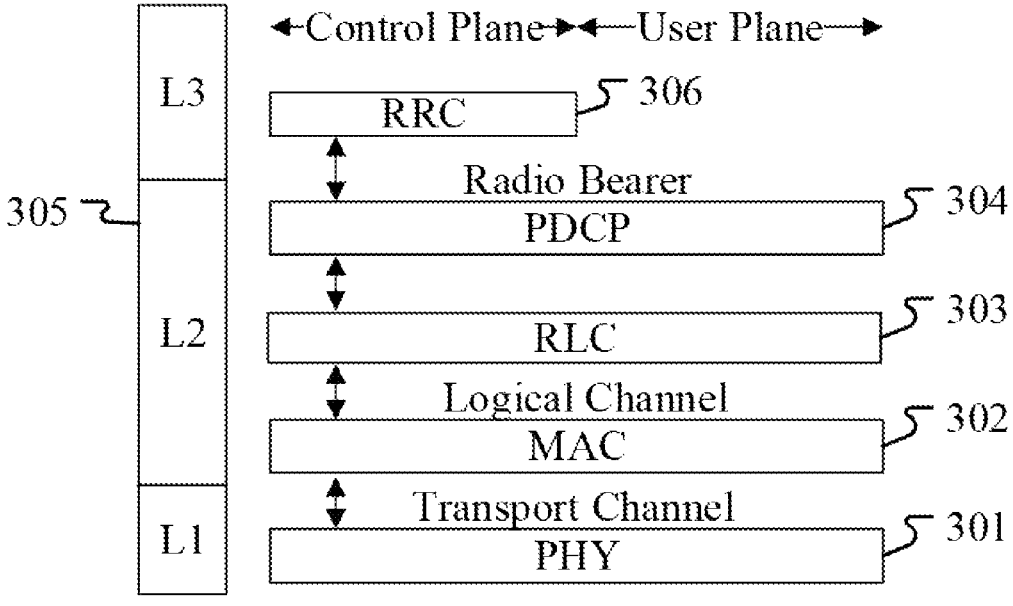
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the target radio signal in the disclosure is generated on the PHY 301.

In one subembodiment, the first radio signal in the disclosure is generated on the PHY 301.

In one subembodiment, the second radio signal in the disclosure is generated on the PHY 301.

In one subembodiment, the third radio signal in the disclosure is generated on the PHY 301.

In one subembodiment, the first signaling in the disclosure is generated on the RRC sublayer 306.

Embodiment 4

Figure 4:
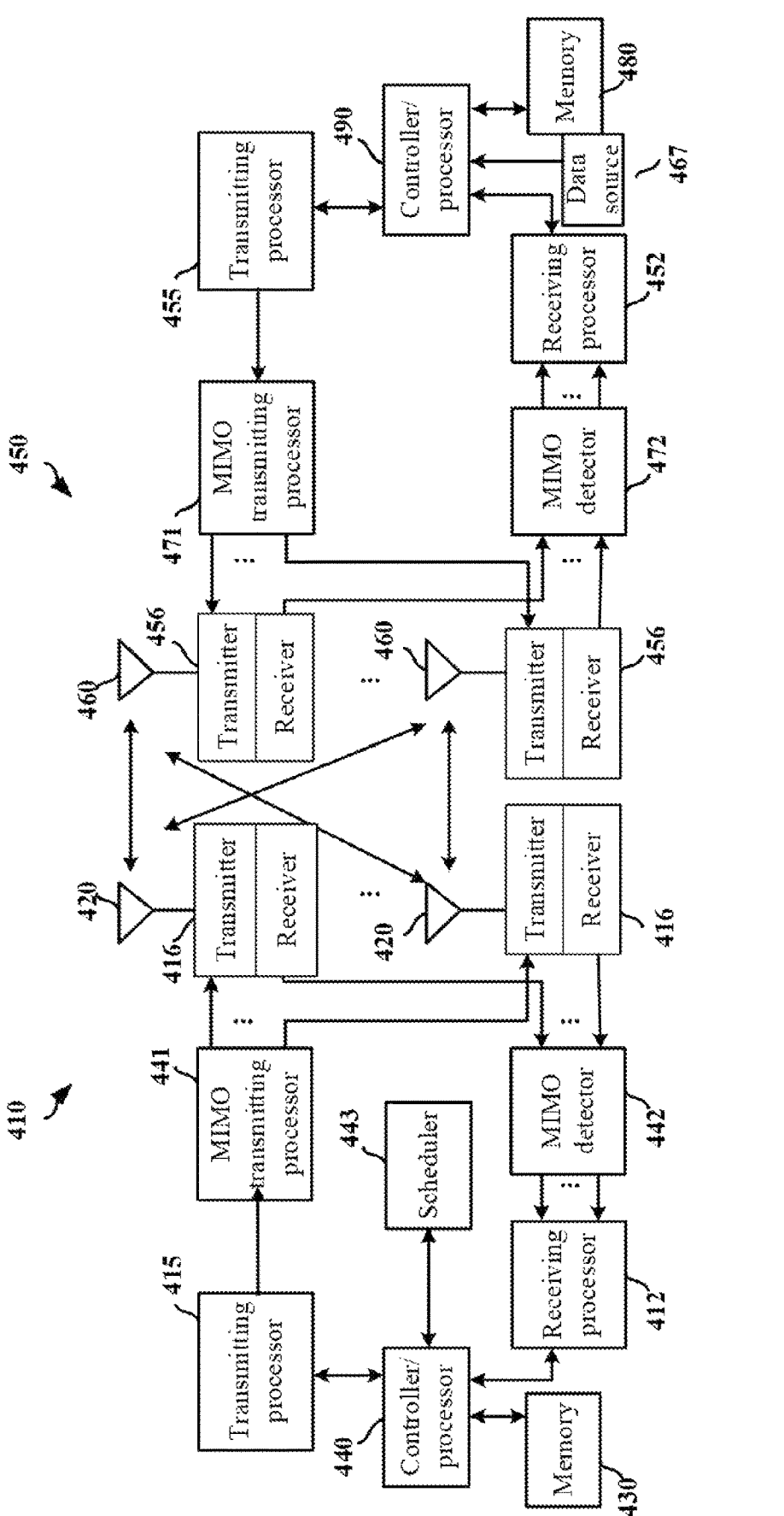
FIG. 4 is a diagram illustrating an evolved node B and a given UE according to one embodiment of the disclosure.

Embodiment 4 illustrates a diagram of a base station and a given UE according to the disclosure, as shown in FIG. 4. FIG. 4 is a block diagram of a gNB 410 in communication with a UE 450 in an access network.

The base station 410 includes a controller/processor 440, a scheduler 443, a memory 430, a receiving processor 412, a transmitting processor 415, an MIMO transmitting processor 441, an MIMO detector 442, a transmitter/receiver 416 and an antenna 420.

The UE 450 includes a controller/processor 490, a memory 480, a data source 467, a transmitting processor 455, a receiving processor 452, an MIMO transmitting processor 471, an MIMO detector 472, a transmitter/receiver 456 and an antenna 460.

In Downlink (DL) transmission, processes relevant to the base station device 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 notifies the scheduler 443 of a transmission requirement, the scheduler 443 is configured to schedule an air-interface resource corresponding to the transmission requirement and notify the scheduling result to the controller/processor 440.

The controller/processor 440 transmits, to the transmitting processor 415, the control information for downlink transmission obtained when the receiving processor 412 processes uplink receiving.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The MIMO transmitting processor 441 performs spatial processing (for example, multi-antenna precoding, digital beamforming) on data symbols, control symbols or reference signal symbols, and outputs a baseband signal to the transmitter 416.

The MIMO transmitting processor 441 outputs an analog transmitting beamforming vector to the transmitter 416.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal. Analog transmitting beamforming is processed in the transmitter 416.

In Downlink (DL) transmission, processes relevant to the UE 450 include the following.

The receiver 456 is configured to convert a radio-frequency signal received via the antenna 460 into a baseband signal and provide the baseband signal to the MIMO detector 472. Analog receiving beamforming is processed in the receiver 456.

The MIMO detector 472 is configured to perform an MIMO detection on the signal received from the receiver 456, and provide a baseband signal subjected to MIMO detection to the receiving processor 452.

The MIMO detector 472 outputs an analog receiving beamforming vector to the receiver 456.

The receiving processor 452 performs signal receiving processing functions of an L1 layer (that is, PHY), including decoding, de-interleaving, descrambling, demodulation, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

The controller/processor 490 transmits, to the receiving processor 452, the control information for downlink receiving obtained when the transmitting processor 455 processes uplink transmission.

The target radio signal in the present disclosure is generated through the transmitting processor 415. The MIMO transmitting processor 441 performs multi-antenna precoding on a baseband signal related to the target radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the target radio signal, and converts the radio frequency signal into a baseband signal and provides the baseband signal to the MIMO detector 472. The MIMO detector 472 performs an MIMO detection on the signal received from the receiver 456. The receiving processor 452 performs channel measurement on the baseband signal output by the MIMO detector 472.

The second radio signal in the present disclosure is generated through the transmitting processor 415. The MIMO transmitting processor 441 performs multi-antenna precoding on a baseband signal related to the second radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the second radio signal, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the second radio signal.

The third radio signal in the present disclosure is generated through the transmitting processor 415. The MIMO transmitting processor 441 performs multi-antenna precoding on a baseband signal related to the third radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the third radio signal, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the third radio signal.

In one embodiment, the receiving processor 412 extracts, from the first radio signal, information about the multi-antenna related transmission of the third radio signal, and the information is transmitted by the controller/processor 440 to the transmitter 416 via the transmitting processor 415 and the MIMO transmitting processor 441 to perform analog transmitting beamforming for the third radio signal.

The first signaling in the present disclosure is generated through the transmitting processor 415 or a higher-layer packet is provided to the controller/processor 440. The MIMO transmitting processor 441 performs multi-antenna precoding on a baseband signal related to the first signaling output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the first signaling, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the first signaling or outputs the baseband signal to the controller/processor 490 to obtain the first signaling.

In UL transmission, processes relevant to the UE 450 include the following.

The data source 467 provides a higher-layer packet to the controller/processor 490. The controller/processor 490 provides header compression, encryption, packet segmentation and reordering, multiplexing and de-multiplexing between a logical channel and a transport channel, to implement the L2 protocol used for the user plane and the control plane. The higher-layer packet may include data or control information, for example, Uplink Shared Channel (UL-SCH).

The controller/processor 490 may be connected to the memory 480 that stores program code and data. The memory 480 may be a computer readable medium.

The controller/processor 490 transmits, to the transmitting processor 455, the control information for uplink transmission obtained when the receiving processor 452 processes downlink receiving.

The transmitting processor 455 receives a bit stream output from the controller/processor 490, and performs signal transmitting processing functions of an L1 layer (that is, PHY), including encoding, interleaving, scrambling, modulation, power control/allocation, generation of physical layer control signaling (including PUCCH, Sounding Reference Signal (SRS)), etc.

The MIMO transmitting processor 471 performs spatial processing (for example, multi-antenna precoding, digital beamforming) on data symbols, control symbols or reference signal symbols, and outputs a baseband signal to the transmitter 456.

The MIMO transmitting processor 471 outputs an analog transmitting beamforming vector to the transmitter 457.

The transmitter 456 is configured to convert the baseband signal provided by the MIMO transmitting processor 471 into a radio-frequency signal and transmit the radio-frequency signal via the antenna 460. Each transmitter 416 performs sampling processing on respective input symbol streams to obtain respective sampled signal streams. Each transmitter 456 performs further processing (for example, digital-to-analogue conversion, amplification, filtering, up conversion, etc.) on respective sampled streams to obtain an uplink signal. Analog transmitting beamforming is processed in the transmitter 456.

In UL transmission, processes relevant to the base station device 410 include the following.

The receiver 416 is configured to convert a radio-frequency signal received via the antenna 420 into a baseband signal and provide the baseband signal to the MIMO detector 442. Analog receiving beamforming is processed in the receiver 416.

The MIMO detector 442 is configured to perform an MIMO detection on the signal received from the receiver 416, and provide a symbol subjected to MIMO detection to the receiving processor 442.

The MIMO detector 442 outputs an analog receiving beamforming vector to the receiver 416.

The receiving processor 412 performs signal receiving processing functions of an L1 layer (that is, PHY), including decoding, de-interleaving, descrambling, demodulation, extraction of physical layer control signaling, etc.

The controller/processor 440 receives a bit stream output from the receiving processor 412, and provides header decompression, decryption, packet segmentation and reordering, multiplexing and de-multiplexing between a logical channel and a transport channel, to implement the L2 protocol used for the user plane and the control plane.

The controller/processor 440 may be connected to the memory 430 that stores program code and data. The memory 430 may be a computer readable medium.

The controller/processor 440 transmits, to the receiving processor 412, the control information for uplink transmission obtained when the transmitting processor 415 processes downlink transmission.

The first radio signal in the present disclosure is generated through the transmitting processor 455. The MIMO transmitting processor 471 performs multi-antenna precoding on a baseband signal related to the first radio signal output by the transmitting processor 455. The transmitter 456 converts the baseband signal provided by the MIMO transmitting processor 471 into a radio frequency signal, performs analog transmitting beamforming, and transmits the radio frequency signal via the antenna 460. The receiver 416 receives the radio frequency signal via the antenna 420, performs analog receiving beamforming, obtains a radio frequency signal related to the first radio signal, and converts the radio frequency signal into a baseband signal and provides the baseband signal to the MIMO detector 442. The MIMO detector 442 performs an MIMO detection on the signal received from the receiver 416. The receiving processor 412 processes the baseband signal output by the MIMO detector 442 to obtain the first radio signal.

In one embodiment, the UE 450 device includes at least one processor and at least one memory. The at least one memory includes computer program codes. The at least one memory and the computer program codes are configured to be used in collaboration with the at least one processor. The UE 450 device at least receives a target radio signal in a first frequency-domain resource, transmits a first radio signal, monitors a second radio signal in a first time window, and monitors a third radio signal in a first time-domain resource in the first frequency-domain resource; wherein a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the UE 450 includes a memory that stores a computer readable instruction program. The computer readable instruction program generates an action when executed by at least one processor. The action includes: receiving a target radio signal in a first frequency-domain resource, transmitting a first radio signal, monitoring a second radio signal in a first time window, and monitoring a third radio signal in a first time-domain resource in the first frequency-domain resource; wherein a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the gNB 410 includes at least one processor and at least one memory. The at least one memory includes computer program codes. The at least one memory and the computer program codes are configured to be used in collaboration with the at least one processor. The gNB 410 at least transmits a target radio signal in a first frequency-domain resource, receives a first radio signal, transmits a second radio signal in a first time window, and transmits a third radio signal in a first time-domain resource in the first frequency-domain resource; wherein a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one embodiment, the gNB 410 includes a memory that stores a computer readable instruction program. The computer readable instruction program generates an action when executed by at least one processor. The action includes: transmitting a target radio signal in a first frequency-domain resource, receiving a first radio signal, transmitting a second radio signal in a first time window, and transmitting a third radio signal in a first time-domain resource in the first frequency-domain resource; wherein a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one subembodiment, the UE 450 corresponds to the UE in the disclosure.

In one subembodiment, the gNB 410 corresponds to the base station in the disclosure.

In one subembodiment, the transmitting processor 415, the MIMO transmitter 441 and the transmitter 416 are used for transmitting the target radio signal in the disclosure.

In one subembodiment, the receiver 456, the MIMO detector 472 and the receiving processor 452 are used for receiving the target radio signal in the disclosure.

In one subembodiment, the transmitting processor 455, the MIMO transmitter 471 and the transmitter 456 are used for transmitting the first radio signal in the disclosure.

In one subembodiment, the receiver 416, the MIMO detector 442 and the receiving processor 412 are used for receiving the first radio signal in the disclosure.

In one subembodiment, the transmitting processor 415, the MIMO transmitter 441 and the transmitter 416 are used for transmitting the second radio signal in the disclosure.

In one subembodiment, the receiver 456, the MIMO detector 472 and the receiving processor 452 are used for receiving the second radio signal in the disclosure.

In one subembodiment, the transmitting processor 415, the MIMO transmitter 441, the transmitter 416 and the controller/processor 490 are used for transmitting the third radio signal in the disclosure.

In one subembodiment, the receiver 456, the MIMO detector 472 and the receiving processor 452 are used for receiving the third radio signal in the disclosure.

In one subembodiment, at least the former three of the transmitting processor 415, the MIMO transmitter 441, the transmitter 456 and the controller/processor 490 are used for transmitting the first signaling in the disclosure.

In one subembodiment, at least the former three of the receiver 416, the MIMO detector 442, the receiving processor 412 and the controller/processor 440 are used for receiving the first signaling in the disclosure.

Embodiment 5

Figure 5:
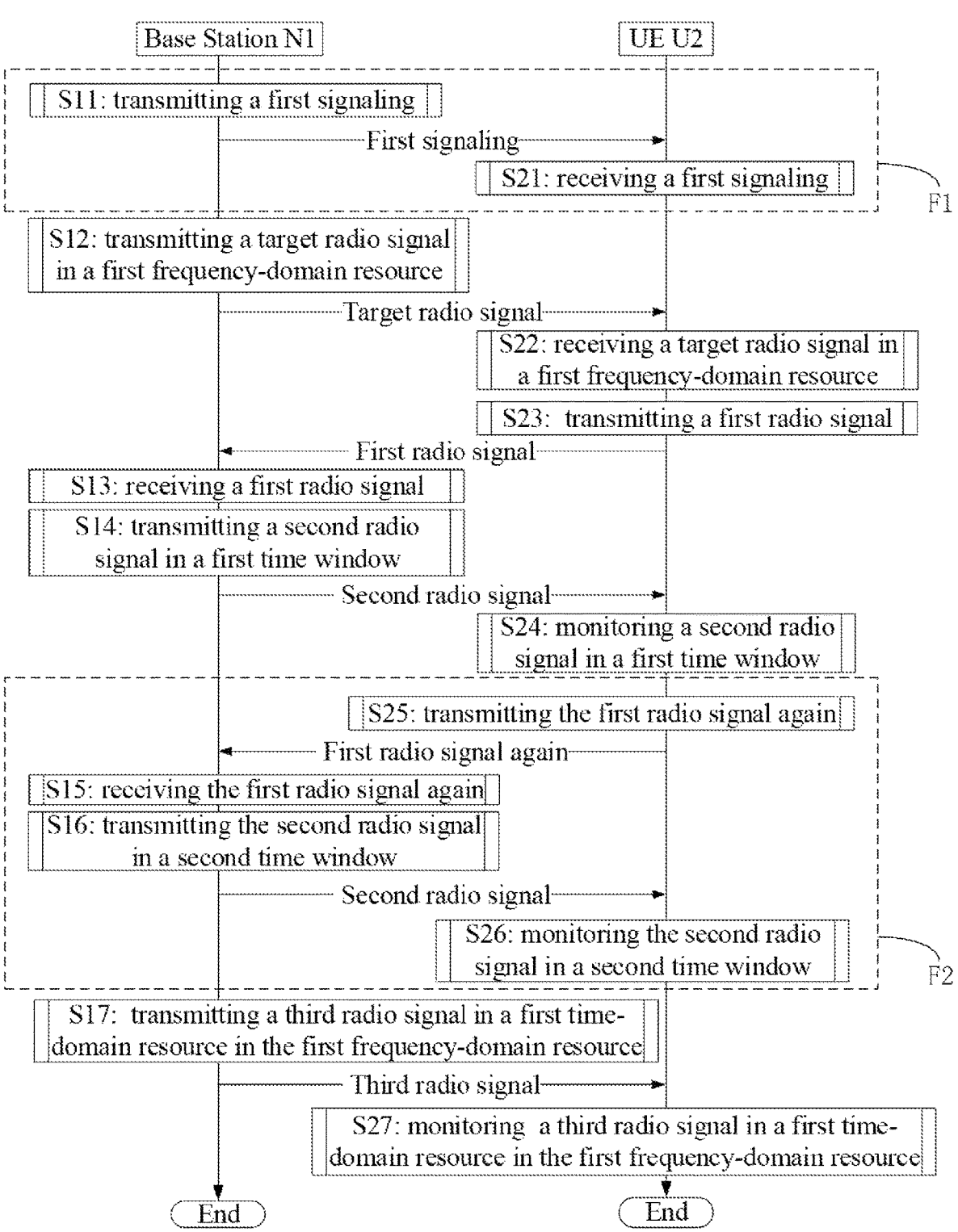
FIG. 5 is a flowchart of transmission of a radio signal according to one embodiment of the disclosure.

Embodiment 5 illustrates an example of a flowchart of transmission of a radio signal according to the disclosure, as shown in FIG. 5. In FIG. 5, a base station N1 is a maintenance base station for a serving cell of a UE U2. Steps in boxes F1 and F2 shown in FIG. 5 are optional.

The base station N1 transmits a first signaling in S11, transmits a target radio signal in a first frequency-domain resource in S12, receives a first radio signal in S13, transmits a second radio signal in a first time window in S14, receives the first radio signal again in S15, transmits the second radio signal in a second time window in S16, and transmits a third radio signal in a first time-domain resource in the first frequency-domain resource in S17.

The UE U2 receives a first signaling in S21, receives a target radio signal in a first frequency-domain resource in S22, transmits a first radio signal in S23, monitors a second radio signal in a first time window in S24, transmits the first radio signal again in S25, monitors the second radio signal in a second time window in S26, and monitors a third radio signal in a first time-domain resource in the first frequency-domain resource in S27.

In Embodiment 5, a channel measurement for the target radio signal is used by the U2 to trigger a transmission of the first radio signal; the first radio signal is used by the N1 to determine a multiantenna related transmission of the third radio signal; the first radio signal is related to a multiantenna related reception of the third radio signal by the U2; the second radio signal is used by the U2 to determine the first time-domain resource, or, the second radio signal is used by the U2 to determine that the first radio signal is correctly received.

In one subembodiment, a time-domain resource occupied by the first radio signal is used by the N1 and the U2 to determine at least one of a start of the first time window or an end of the first time window.

In one subembodiment, the second radio signal is used by the U2 to determine the first time-domain resource, and the first time-domain resource is one time window.

In one subembodiment, the second radio signal is used by the U2 to determine whether a target time interval belongs to the first time-domain resource.

In one subembodiment, steps in box F1 exist, and the first signaling is used by the U2 to determine a length of the first time window.

In one subembodiment, steps in box F2 exist, the second radio signal is not correctly received by the U2 in the first time window.

In one subembodiment, the second radio signal is used by the U2 to determine a multiantenna related reception used for monitoring the third radio signal.

If no conflict is incurred, the above subembodiments may be combined arbitrarily.

Embodiment 6

Figure 6:
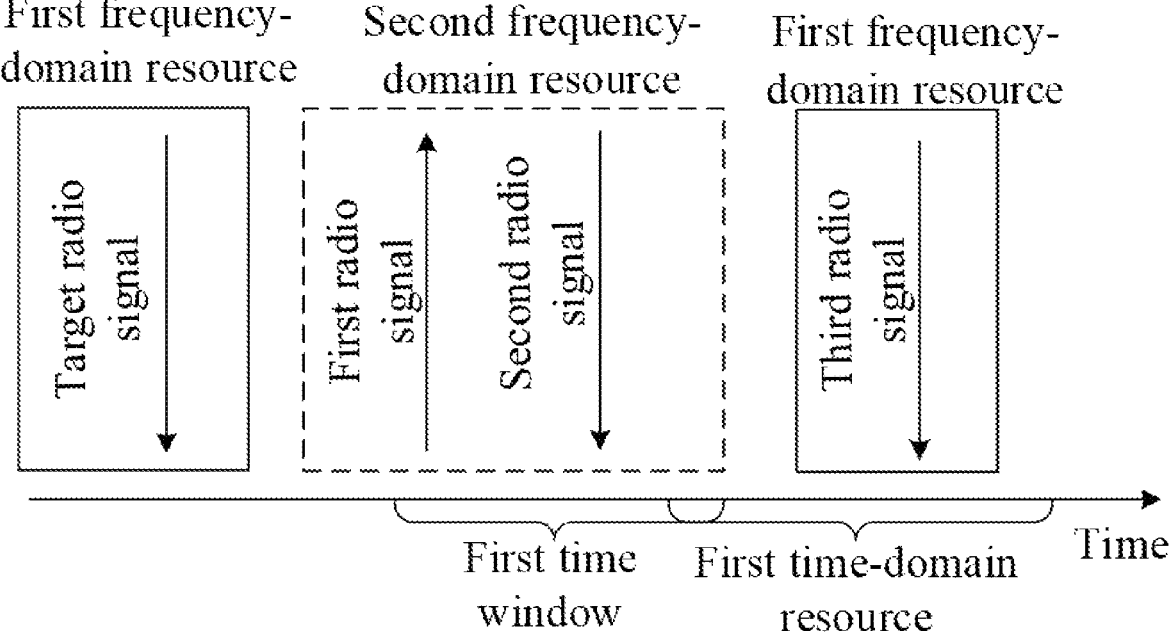
FIG. 6 is a diagram illustrating time-domain resources and a timing sequence according to one embodiment of the disclosure.

Embodiment 6 illustrates an example of frequency-domain resources and a timing sequence, as shown in FIG. 6. In FIG. 6, radio signals in solid-line boxes are transmitted in a first frequency-domain resource, and radio signals in dash-line boxes are transmitted in a second frequency-domain resource.

In Embodiment 6, a UE receives a target radio signal, transmits a first radio signal, receives a second radio signal and receives a third radio signal in turn in time domain; wherein the target radio signal and the third radio signal are transmitted in the first frequency-domain resource, the first radio signal and the second radio signal are transmitted in the second frequency-domain resource. A time-domain resource occupied by the first radio signal is used for determining a first time window after the first radio signal. A time-domain resource occupied by the second radio signal is used for determining a first time-domain resource.

In one subembodiment, the first frequency-domain resource and the second frequency-domain resource are orthogonal in frequency domain.

In one subembodiment, the first frequency-domain resource and the second frequency-domain resource are on different subcarriers.

In one subembodiment, the first frequency-domain resource is deployed on unlicensed spectrum, and the second frequency-domain resource is deployed on licensed spectrum.

In one subembodiment, the first frequency-domain resource and the second frequency-domain resource are on same subcarrier(s).

In one subembodiment, the first frequency-domain resource and the second frequency-domain resource are both deployed on unlicensed spectrum.

In one subembodiment, the first time window is consecutive in time domain.

In one subembodiment, the first time-domain resource is inconsecutive in time domain.

In one subembodiment, the first time window and the first time-domain resource are not orthogonal in time domain.

Embodiment 7

Figure 7:
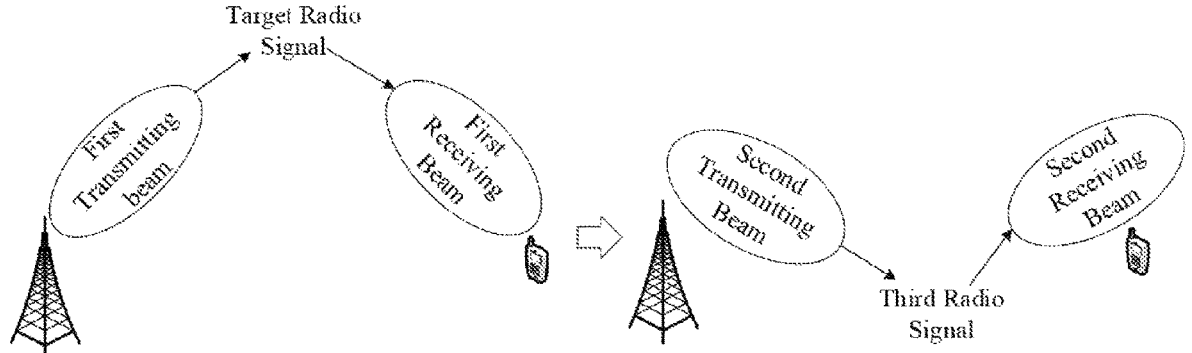
FIG. 7 is a diagram illustrating multiantenna related transmissions and receptions of a target radio signal and a third radio signal according to one embodiment of the disclosure.

Embodiment 7 illustrates an example of multiantenna related transmissions and receptions of a target radio signal and a third radio signal, as shown in FIG. 7.

In Embodiment 7, a first transmitting beam is used for transmitting a target radio signal, and a first receiving beam is used for receiving the target radio signal; a second transmitting beam is used for transmitting a third radio signal, and a second receiving beam is used for receiving the third radio signal. The first transmitting beam has a different transmitting direction from the second transmitting beam, and the first receiving beam has a different receiving direction from the second receiving beam.

In one subembodiment, the transmitting beam is an analog transmitting beam, and the receiving beam is an analog receiving beam.

In one subembodiment, an analog beamforming vector is applied to a shift of a Radio Frequency (RF) circuit to generate an analog beam.

In one subembodiment, a UE performs a channel measurement for the target radio signal, and a result of the channel measurement is lower than a target threshold; the UE transmits a first radio signal, and the first radio signal is used for determining the second transmitting beam; and the UE monitors the third radio signal using the second receiving beam.

Embodiment 8

Figure 8:
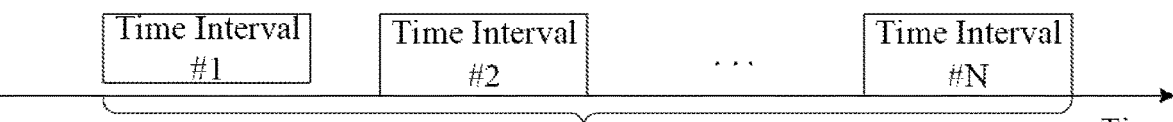
FIG. 8 is a diagram illustrating a target time interval according to one embodiment of the disclosure.

Embodiment 8 illustrates an example of a target time interval, as shown in FIG. 8.

In Embodiment 8, the first time-domain resource includes N inconsecutive time intervals in time domain, the target time interval is one of the N time intervals, and the N is a positive integer.

In one subembodiment, the N is greater than 1.

In one subembodiment, an LBT is used for determining the N time intervals.

In one subembodiment, the second radio signal is used for determining the target time interval.

In one subembodiment, a time-domain resource occupied by the second radio signal is used for determining the target time interval.

In one subembodiment, a time-domain resource occupied by the second radio signal is used for determining at least one of a start of the target time interval or an end of the target time interval.

In one subembodiment, a value of a bit block which generates the second radio signal through channel coding is used for determining the target time interval.

Embodiment 9

Figure 9:
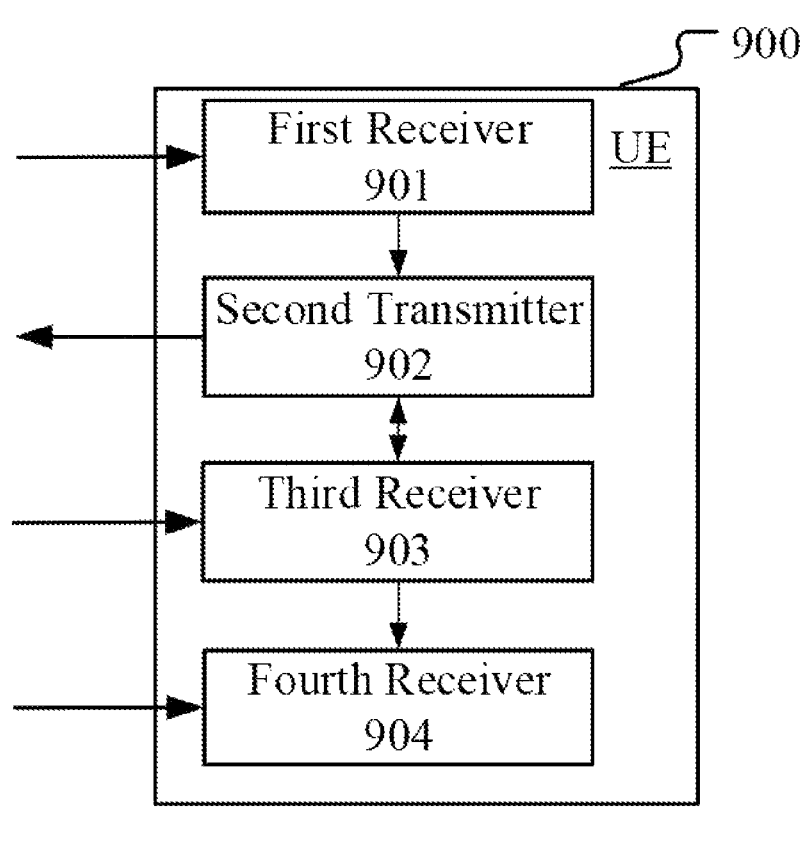
FIG. 9 is a structure block diagram illustrating a processing device in a UE according to one embodiment of the disclosure.

Embodiment 9 illustrates an example of a structure block diagram of a processing device in a UE, as shown in FIG. 9. In FIG. 9, the processing device 900 in the UE mainly includes a first receiver 901, a second transmitter 902, a third receiver 903 and a fourth receiver 904.

In Embodiment 9, the first receiver 901 receives a target radio signal in a first frequency-domain resource, the second transmitter 902 transmits a first radio signal, a third receiver 903 monitors a second radio signal in a first time window, and a fourth receiver 904 monitors a third radio signal in a first time-domain resource in the first frequency-domain resource.

In Embodiment 9, a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one subembodiment, a time-domain resource occupied by the first radio signal is used for determining at least one of a start of the first time window or an end of the first time window.

In one subembodiment, the second radio signal is used for determining the first time-domain resource, and the first time-domain resource is one time window.

In one subembodiment, the second radio signal is used for determining whether a target time interval belongs to the first time-domain resource.

In one subembodiment, the first receiver 901 receives a first signaling; wherein the first signaling is used for determining a length of the first time window.

In one subembodiment, the second transmitter 902 transmits the first radio signal again; and the third receiver 903 monitors the second radio signal in a second time window; wherein the second radio signal is not correctly received in the first time window.

In one subembodiment, the second radio signal is used for determining a multiantenna related reception used for monitoring the third radio signal.

Embodiment 10

Figure 10:
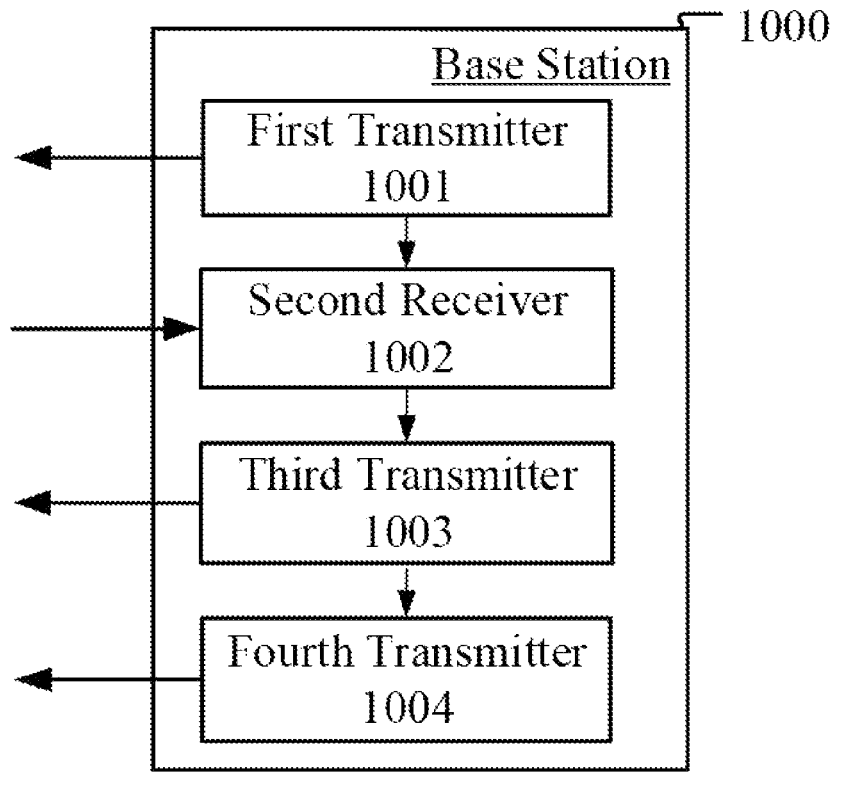
FIG. 10 is a structure block diagram illustrating a processing device in a base station according to one embodiment of the disclosure.

Embodiment 10 illustrates an example of a structure block diagram of a processing device in a base station, as shown in FIG. 10. In FIG. 10, the processing device 100 in the base station mainly includes a first transmitter 1001, a second receiver 1002, a third transmitter 1003 and a fourth transmitter 1004.

In Embodiment 10, the first transmitter 1001 transmits a target radio signal in a first frequency-domain resource, the second receiver 1002 receives a first radio signal, the third transmitter 1003 transmits a second radio signal in a first time window, and the fourth transmitter 1004 transmits a third radio signal in a first time-domain resource in the first frequency-domain resource.

In Embodiment 10, a channel measurement for the target radio signal is used for triggering a transmission of the first radio signal; the first radio signal is used for determining a multiantenna related transmission of the third radio signal; the first radio signal is related to a multiantenna related reception of the third radio signal; the second radio signal is used for determining the first time-domain resource, or, the second radio signal is used for determining that the first radio signal is correctly received.

In one subembodiment, a time-domain resource occupied by the first radio signal is used for determining at least one of a start of the first time window or an end of the first time window.

In one subembodiment, the second radio signal is used for determining the first time-domain resource, and the first time-domain resource is one time window.

In one subembodiment, the second radio signal is used for determining whether a target time interval belongs to the first time-domain resource.

In one subembodiment, the first transmitter 1001 is used for transmitting a first signaling; wherein the first signaling is used for determining a length of the first time window.

In one subembodiment, the second receiver 1002 receives the first radio signal again; and the third transmitter 1003 transmits the second radio signal in a second time window; wherein the second radio signal is not correctly received in the first time window.

In one subembodiment, the second radio signal is used for determining a multiantenna related reception used for monitoring the third radio signal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method performed by a User Equipment (UE), the method comprising:

receiving a channel state information reference signal (CSI-RS) in a first frequency-domain resource;

transmitting an uplink transmission including a beam recovery request based on a channel measurement of the CSI-RS;

monitoring for a first physical downlink control channel (PDCCH) within a first time window, wherein the first PDCCH includes Downlink Control Information (DCI); and monitoring for a second PDCCH within a first time-domain resource that is in the frequency-domain resource.

2. The method of claim 1, wherein a start of the first time window is a time-domain resource where the uplink transmission is located plus a first offset; or, if the first PDCCH is correctly received, an offset between a start of the first time-domain resource and a time-domain resource occupied by the first PDCCH is configured by default.

3. The method of claim 1, further comprising:

receiving a first signaling; wherein the first signaling is a higher-layer signaling and the first signaling is used for determining a length of the first time window.

4. The method of claim 1, further comprising:

on a condition that the first PDCCH is not received, retransmitting the uplink transmission including the beam recovery request; and monitoring for the first PDCCH in a second time window.

5. A method performed by a base station (BS), the method comprising:

transmitting a channel state information reference signal (CSI-RS) in a frequency-domain resource;

receiving an uplink transmission including a beam recovery request;

transmitting a first physical downlink control channel (PDCCH) within a first time window, wherein the first PDCCH includes Downlink Control Information (DCI); and transmitting a second PDCCH in a first time-domain resource in the frequency-domain resource.

6. The method of claim 5, wherein a start of the first time window is a time-domain resource where the uplink transmission is located plus a first offset; or, if the first PDCCH is correctly received, an offset between a start of the first time-domain resource and a time-domain resource occupied by the first PDCCH is configured by default.

7. The method of claim 5, further comprising:

transmitting a first signaling; wherein the first signaling is a higher-layer signaling, and the first signaling is used for determining a length of the first time window.

8. The method of claim 5, further comprising:

receiving a retransmission of the uplink transmission including the beam recovery request; and transmitting the first PDCCH in a second time window.

9. A user equipment (UE), comprising:

a transceiver; and a processor;

wherein the transceiver and processor are configured to:

receive a channel state information reference signal (CSI-RS) in a frequency-domain resource;

transmit an uplink transmission including a beam recovery request based on a channel measurement of the CSI-RS;

monitor for a first physical downlink control channel (PDCCH) in a first time window, wherein the first PDCCH includes Downlink Control Information (DCI); and monitor for a second PDCCH within a first time-domain resource that is in the frequency-domain resource.

10. The UE of claim 9, wherein a start of the first time window is a time-domain resource where the uplink transmission is located plus a first offset; or, if the first PDCCH is correctly received, an offset between a start of the first time-domain resource and a time-domain resource occupied by the first PDCCH is configured by default.

11. The UE of claim 9, wherein the transceiver and the processor are further configured to:

receive a first signaling; wherein the first signaling is a higher-layer signaling, and the first signaling is used for determining a length of a first time window.

12. The UE of claim 9, wherein the transceiver and processor are further configured to:

on a condition that the first PDCCH is not received, retransmitting uplink transmission including the beam recovery request; and monitoring for the first PDCCH in a second time window.

13. The method of claim 1, wherein the uplink transmission includes a physical uplink control channel (PUCCH).

14. The method of claim 1, wherein the frequency-domain resource is deployed on unlicensed spectrum, and the uplink transmission is transmitted on licensed spectrum.

15. The method of claim 1, wherein the monitoring for the first PDCCH comprises blind decoding.

16. The method of claim 1, wherein the first PDCCH includes a first physical layer signaling marked by a Common Control Radio Network Temporary Identity (CC-RNTI).

17. The UE of claim 9, wherein the uplink transmission includes a physical uplink control channel (PUCCH).

18. The UE of claim 9, wherein the frequency-domain resource is deployed on unlicensed spectrum, and the uplink transmission is transmitted on licensed spectrum.

19. The UE of claim 9, wherein the monitoring for the first PDCCH comprises blind decoding.

20. The UE of claim 9, wherein the first PDCCH includes a first physical layer signaling marked by a Common Control Radio Network Temporary Identity (CC-RNTI).

* * * * *